United States Patent [19]

Jukkola

[11] 4,106,210

[45] Aug. 15, 1978

[54] SOLIDS DISCHARGE SYSTEM WITH COOLING MEANS FOR PRESSURIZED FLUID BED REACTORS

[75] Inventor: Walfred Wilhelm Jukkola, Westport, Conn.

[73] Assignee: Dorr-Oliver Incorporated, Stamford, Conn.

[21] Appl. No.: 757,430

[22] Filed: Jan. 6, 1977

[51] Int. Cl.² ............................................. F26B 3/08
[52] U.S. Cl. ........................................ 34/10; 34/57 R; 302/53
[58] Field of Search .................... 34/10, 57 A, 57 R; 302/53

[56] References Cited

U.S. PATENT DOCUMENTS

| 2,715,018 | 8/1955 | Lapple et al. | 302/53 |
| 2,873,145 | 2/1959 | Moser, Jr. | 302/53 |

FOREIGN PATENT DOCUMENTS

| 1,329,328 | 4/1963 | France | 34/57 R |

Primary Examiner—John J. Camby
Attorney, Agent, or Firm—Burtsell J. Kearns; Harold M. Snyder

[57] ABSTRACT

A system for cooling, depressurizing and discharging solids from a pressurized fluid bed reactor which includes a secondary fluid bed surge vessel arranged to dissipate a substantial amount of the pressure in the system and a plug flow discharge conduit leading from the secondary vessel to reduce the pressure at the outlet thereof to essentially ambient pressure.

8 Claims, 1 Drawing Figure

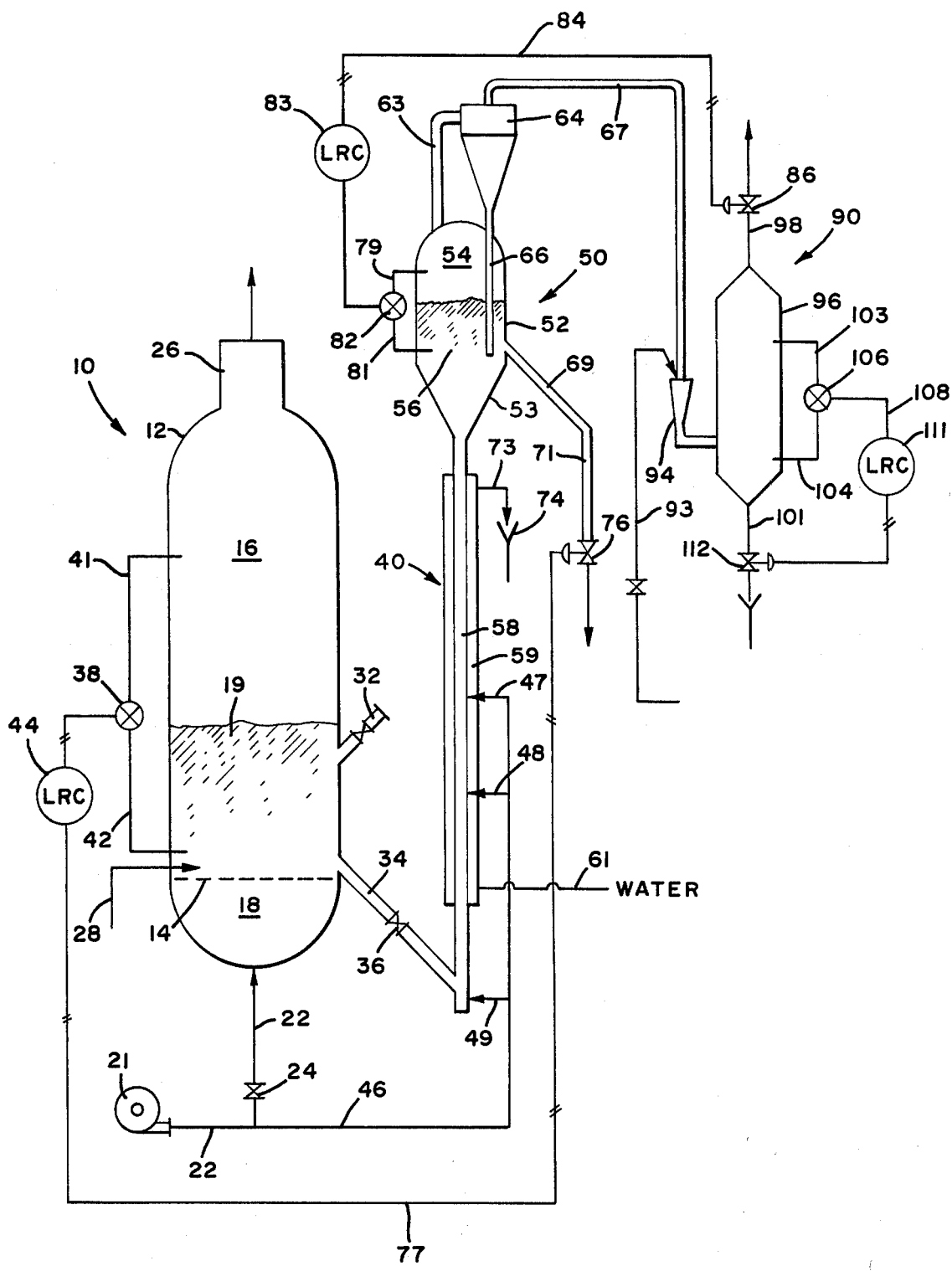

SOLIDS DISCHARGE SYSTEM WITH COOLING MEANS FOR PRESSURIZED FLUID BED REACTORS

This invention is directed to a novel system for essentially continuously discharging cooled particulate solids from a pressurized fluid bed reactor to ambient pressure.

Many operations carried out in fluid bed reactors such a calcination and iron ore reduction and in systems such as pressurized fluid bed boilers are conducted at elevated pressure levels and require that hot solids must be discharged from the pressurized fluid bed reactor. The current method for discharging such solids is the lock-hopper system. This lock-hopper system is a batch type arrangement wherein a quantity of solids is first discharged from the fluid bed reactor into a pressurized vessel. After a predetermined amount of solids has entered the vessel, the solids inlet valve is closed off and the vessel is depressurized and then emptied. This cycle of pressurization, filling with the solids, depressurization and discharge of solids is repeated as required. The difficulties in this kind of operation increase as the pressure level within the reactor increases and with increasing hardness of the solids being discharged.

Thus, the lock-hopper system has certain inherent shortcomings. For example, by definition it is a batch type operation wheras a continuous system would be much preferred. The system requires valves operable at elevated temperatures which are subject to sticking due to thermal expansion and seal failure under the severe operating conditions. Both the depressurizing valve and the vent lines are subject to severe abrasive conditions as the result of the rapid movement of hard solids therethrough under the influence of the differential pressure. Such systems are also subject to sequence control failures.

A novel structure has now been provided for continuous discharge and cooling of solids from a pressurized fluid bed reactor, which incorporates a fluidized standpipe and secondary fluidized bed surge vessel as well as a plug flow discharge column to substantially obviate the necessity for high temperature valves in the discharge system.

It is an object of this invention to provide an improved discharge system for a pressurized fluid bed reactor.

It is a further object of this invention to provide a means for cooling and continuously discharging solids from a pressurized fluid bed reactor.

Other objects and advantages will become apparent from the following description taken in conjunction with the accompanying drawing in which:

The FIGURE is a schematic representation of the novel discharge and cooling system for pressurized fluid bed reactors in accordance with the present invention.

Generally speaking, the discharge and cooling system of the present invention is effective for pressurized fluid bed reactors operating at up to 150 psi and incorporates solids discharge from a main pressurized fluid bed reactor to a fluidized standpipe leading to a secondary fluid bed surge reactor or vessel at an elevation well above the fluid bed in the main reactor and a discharge conduit from the secondary surge reactor arranged to provide plug flow therein for further depressurization to approximately ambient pressure.

In addition, the standpipe of the system is provided with cooling means. The level of the fluid bed in the pressurized main reactor is maintained constant by controlling the discharge of solids from the secondary surge reactor while the fluid bed level in the secondary surge reactor is maintained constant by controlling the amount of gas discharging from the system.

Referring now to the drawing, the principal elements of the system illustrated are the main fluid bed reactor 10, the standpipe 40, the secondary surge reactor or vessel 50, the discharge depressurizing conduit 71 and the scrubber system 90. Pressurized fluid bed reactor 10 has a metal shell 12 which may be lined with a layer of refractory material (not shown). The interior of reactor 10 is divided into two compartments by the constriction plate 14, with reaction chamber 16 above the constriction plate 14 and a smaller windbox 18 below the constriction plate.

A gas inlet conduit 22 is provided for supplying fluidizing gases to the windbox 18. Gas from windbox 18 passing through the constriction plate 14 fluidizes a body of particulate solids 19 which is located in reaction chamber 16 and rests on the constriction plate 14. Exhaust gases from the reaction chamber 16 leave the reactor through exhaust gas duct 26. Fuel is injected into the fluidized bed 19 through line 28 while solids may be introduced into the fluidized bed through solids inlet 32. Air is supplied to line 22 by the compressor 21. Solids are withdrawn from the fluidized bed 19 through discharge conduit 34 which has an emergency or maintenance valve 36 therein. The solids discharge conduit 34 is connected to the cooling standpipe system 40 at the bottom of the standpipe element 58. The standpipe 58 extends from below the level of the fluid bed 19 in the main reactor 10 to an elevation well above the top surface of fluid bed 19 where it is connected to a secondary surge vessel 50 at the bottom thereof. The standpipe air conduit 46 is connected to line 22 to provide air to a series of air inlets 47, 48 and 49 in the standpipe. In practice, it is preferred that the standpipe 58 be of tapered configuration, being of relatively narrow diameter near the bottom thereof, and substantially greater in diameter at the top, proximate the junction with the surge vessel 50. The standpipe 58 is surrounded over a substantial portion of its length by a water jacket 59 in cooling relation to standpipe 58. Water is supplied to water jacket 59 by conduit 61, and, after circulation through the water jacket 59, is removed through discharge conduit 73 and is received in discharge trough 74, for withdrawal from the system. If desired, cooling coils may be employed instead of water jacket 59 for cooling the standpipe 58.

The secondary reactor or surge vessel 50 has a metal shell 52 defining a reaction chamber 54. At the lower end thereof, secondary reactor shell 52 has a conical portion 53 which narrows to join with the standpipe 58 at the upper extremity of the later. Fluidized bed 56, composed of particulate solids, is present in the reactor chamber 54. The off-gases from reaction chamber 54 are conducted to the cyclone 64 through conduit 63. Cyclone 64 effects a separation between the gases and entrained solids and returns the solids to fluidized bed 56 through downcomer 66 which terminates within fluidized bed 56. The gases from cyclone 64 are forwarded to the scrubber system 90 through conduit 67.

The solids discharge and depressurizing conduit 71 communicates with reaction chamber 54 of the secondary reactor 50, having an inclined portion 69 connected to the main vertical portion 71. A control valve 76 is positioned in the vertical portion 71 of the solids discharge conduit.

The scrubber system 90 comprises a venturi scrubber 94 and a scrubber 96 of the impingement tray type. A water inlet conduit 93 is in communication with the venturi scrubber 94. The exhaust gases from the scrubber 96 leave through an exhaust conduit 98 which is controlled by a valve 86. The liquids and the solids trapped thereby leave scrubber 96 through the lower outlet conduit 101 controlled by valve 112.

The control arrangements for the system of the present invention will now be described. The level of the fluidized bed 19 in the main reactor 10 is controlled by means of valve 76 which regulates the discharge of solids from the secondary fluidized bed vessel 50 through solids discharge conduit 71. The control system for valve 76 comprises an upper probe 41 and a lower probe 42 which detect pressures within the reaction chamber 16 above bed 19 and within bed 19 itself. These pneumatic pressure readings are forwarded by transmitter 38 through electrical or pneumatic conduit 77 to the level-recorder-controller 44. The level-recorder-controller 44 responds to the differential pressure detected by the pressure probes 41 and 42.

When the differential pressure detected by probes 41 and 42 is greater than a predetermined level, this indicates that the bed 19 is higher than desired and level-recorder-controller 44 will actuate valve 76 to increase flow until the desired bed level is attained. This circuit operates in an opposite fashion when the bed level of fluidized bed 19 is too low wherupon valve 76 is actuated to decrease flow until the bed level is restored to that desired.

As for the bed level of the fluid bed surge vessel 50, the electrically or pneumatically controlled valve 86 responds to a circuit quite similar to that described above having an upper probe 79 and a lower probe 81 together with transmitter 82 and a level-recorder-controller 83. The electrical or pneumatic control valve 86 regulates the gas discharge from the scrubber system 90; that is, an increase in the air discharge rate from valve 86 permits an increase in the amount of solids entering the surge vessel 50, while a decrease in air discharge rate throttles down the quantity of solids entering the reaction chamber 54.

A third control system entirely similar to those just described is provided for the scrubber system 90 to regulate the discharge of the scrubber effluent through an electrically or pneumatically controlled valve 112. This control system has upper probe 103 and lower probe 104 located in unit 96 with transmitter 106 and level-recorder-controller 111 located in circuit 108 which communicates with the valve 112. This is a common system used for scrubbers operating in pressurized systems.

In the operation of a system in accordance with this invention, a pressurized fluidized bed 19 is maintained in the reaction chamber of the main fluid bed reactor 10. Air from compressor 21 is supplied through line 22 to the windbox 18 of the reactor 10 from which it passes upwardly through the constriction plate 14 to fluidize the solids forming bed 19, with the exhaust gases leaving the reaction chamber through exhaust gas duct 26. Fuel or other liquids, slurries, gases or gas-blown fine solids required in the reaction chamber 16 may be introduced through line 28, while coarser solid constituents required within the reactor 10 may be introduced through conduit 32. The solids from reactor chamber 16 are discharged by means of inclined discharge pipe 34 into the vertical, water-cooled standpipe 58, at the top of which is the secondary surge vessel 50. Fluidizing air is introduced into the standpipe 58 and the surge vessel 50 through conduit 46 and air inlets 47, 48 and 49. The solids that flow into the standpipe 58 through discharge pipe 34 are fluidized within the standpipe 58 and, reaching reactor chamber 54 of the surge vessel 50, form a fluidized bed therein. If required, air inlets (not shown) may be provided for introducing air directly into the bottom of surge vessel 50 from line 22 to maintain fluidization in vessel 50.

The flow of fluidizing air to the main reactor is kept essentially constant to satisfy the requirements of the process being carried out in the main reactor. However, the air flow to the standpipe 58 and the surge vessel 50 is regulated by the control circuit including level-recorded-controller 83, which senses the bed level in the surge vessel chamber 54. The output from level-recorder-controller 83 controls the operation of valve 86 at the gas discharge outlet of the scrubber unit 96, either increasing or decreasing the amount of air discharged from the system. As indicated previously, an increase in the air discharge from valve 86 increases the amount of solids entering the surge vessel 50 via the standpipe 58, while a decrease in air discharge rate decreases solids flow up the standpipe 58.

Standpipe 58 is made as high as practical to maximize depressurization in this portion of the system. With some materials, a fluid density of about 70 lbs. per cubic foot at low space rates is possible in the standpipe, and this represents a very substantial delivery capacity. The standpipe should be of tapered design to maintain about uniform space rates. The static pressure differential in standpipe 58 is about 0.5 psig/ft. If, for example, the difference in elevation between the top of the fluid bed in the main reactor 10 and the surge vessel 50 is 150 feet, a pressure decrease of 75 psig is effected in the standpipe 58 and the surge vessel bed 56. The decrease in pressure in the standpipe as the gases move upward involves a substantial increase in gas volume. If the space rate is to be maintained, the standpipe must be tapered to accommodate the increasing gas volume. Further, a substantial amount of cooling is effected in the standpipe and in the surge vessel bed 56 by the fluidizing air and, in addition, the water jacket 59 surrounding standpipe 58 also produces considerable cooling of the particulate solids moving through standpipe 58. The surge vessel bed 56 is the disengaging bed wherein the fluidizing gas is released from contact with the particulate solids and it also provides an inventory of solids to assure continuous operation of the system despite variations in the discharge flow permitted by valve 76.

The pressure within the surge vessel 50 under the conditions just described is still elevated substantially above the ambient pressure. This pressure has, therefore, to be dissipated in the discharge conduit or plug flow column 71. The solid material in the conduit 71 is not fluidized but, instead, forms a plug of particulate solids moving more or less as a body down conduit 71 and through which gas from reaction chamber 54 flows. These gases are depressurized as they flow through the voids in the particles, thus minimizing the pressure drop across the discharge valve 76. In a working system as described above, this vertical plug flow column 71 will be quite long; for example, 25 feet is a practical minimum length, to allow relatively complete defluidization of the solids.

There has thus been disclosed a relatively simplified method for cooling and depressurizing solids discharged from a pressurized fluid bed reactor system.

Although the present invention has been described with particular reference to preferred embodiments, it will be apparent to those skilled in the art that variations and modifications may be made without departing from the essential spirit and scope of the invention. It is intended to include all such variations and modifications.

I claim:

1. A system for continually discharging particulate solids from a main pressurized fluid bed reactor to depressurize and cool said solids, comprising a standpipe arranged to receive at a relatively low level solids discharged at elevated pressure from said main pressurized fluid bed reactor, means for fluidizing said particulate solids in said standpipe to thereby elevate said solids to a level well above the fluid bed in said main pressurized fluid bed reactor to effect a first increment of depressurization, cooling means in contact with said standpipe, an elevated secondary pressurized fluid bed surge vessel located at a relatively high level arranged to receive said elevated particulate solids from said standpipe, said secondary pressurized fluid bed surge vessel operating at a pressure substantially lower than said main pressurized fluid bed reactor but well above ambient pressure, a plug flow solids discharge conduit connected to said secondary fluidized bed reactor for receiving particulate solids discharged therefrom and means, including a predetermined length of said conduit filled with particulate solids, to depressurize the unfluidized solids in said conduit to essentially ambient pressure at the discharge end thereof.

2. The system of claim 1 wherein said means for fluidizing said particulate solids in said standpipe comprises gas inlets at least at the bottom of said standpipe to introduce a flow of fluidizing gas into said standpipe.

3. The system of claim 1 wherein said means for fluidizing said particulate solids comprises gas inlets in said standpipe providing sufficient fluidizing gas to also fluidize said secondary pressurized fluid bed surge vessel.

4. The system of claim 2 wherein said cooling means comprises a water jacket which provides cooling for said particulate solids in addition to that provided by the introduction of fluidizing gas into said standpipe.

5. The system of claim 1 wherin said plug flow solids discharge conduit is valve controlled and the solids flow through said conduit is regulated to stabilize the fluid bed level in said main fluid bed reactor.

6. The system of claim 5 wherein bed level control means for said secondary fluid bed surge vessel is provided including valve means regulating the flow of exhaust gas from said secondary fluid bed surge vessel to thereby control admission of solids to said surge vessel from said standpipe.

7. The system of claim 1 where said standpipe is tapered from bottom to top thereof to provide a larger cross-section at the top than at the bottom to assure a uniform space rate for the gases flowing within said standpipe.

8. A process for continuously discharging hot particulate solids from a pressurized fluid bed reactor to cool and depressurize said solids comprising:
   a. elevating particulate solids discharged from a first pressurized fluidized bed in a fluidized column to a level substantially above said first pressurized fluidized bed to effect a first increment of depressurization,
   b. disposing said elevated particulate solids in a secondary pressurized fludized bed operating at a substantially lower pressure than that of said first pressurized bed to effect additional cooling,
   c. establishing a plug of solids of predetermined length for discharge from said secondary pressurized fluidized bed,
   d. permitting continuous gas flow through said plug and
   e. continuously discharging solids from said plug at an inhibited rate to maintain said plug length and thereby depressurize said solids to essentially ambient pressure.

* * * * *